July 29, 1952　　　G. E. VALLEY, JR　　　2,605,404
PULSE GENERATOR
Filed Oct. 9, 1945
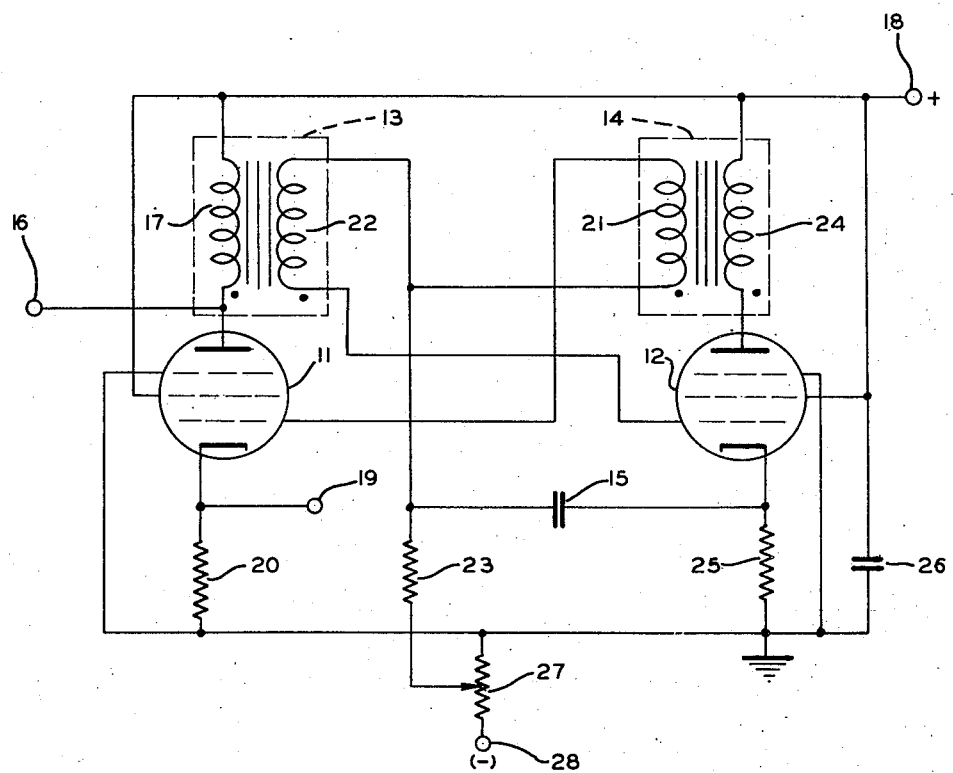
INVENTOR
GEORGE E. VALLEY JR.
BY
Ralph L. Chappell
ATTORNEY

Patented July 29, 1952

2,605,404

UNITED STATES PATENT OFFICE 2,605,404

PULSE GENERATOR

George E. Valley, Jr., Cambridge, Mass., assignor, by mesne assignments, to the United States of America as represented by the Secretary of the Navy Application October 9, 1945, Serial No. 621,337

11 Claims. (Cl. 250—27)

This invention relates to pulse generators, and more particularly to a pulse generator for producing pulses of extremely short time duration.

There have been devised in the art many different types of pulse generators for producing pulses of as short as one microsecond duration. However, even shorter pulses than this are desirable to give high resolution and better definition in range with naviagation, fire control, and other precision types of radar systems. In addition, such very short pulses are necessary if range marks or marker pulses are to be placed on cathode ray tube expanded sweep traces of, say, one microsecond duration.

Accordingly, one object of this invention is to provide a pulse generator of extremely short pulses.

Another object is to provide a pulse generator of extremely short pulses, each being of reasonably large amplitude.

Other and further objects will appear in the course of the following description when taken with the accompanying drawing, which shows in schematic circuit form one embodiment of this invention.

In the embodiment shown in the drawing, the major components comprise two similar high transconductance type pentode vacuum or electron tubes 11 and 12, two pulse transformers 13 and 14, and a feedback condenser 15. As indicated by the dots at the ends of the coils symbols of the transformers, all coils are wound in the same direction and hence no inversion action takes place in either transformer. Input terminal 16 is connected directly to the plate of tube 11, as is one end of primary coil 17 of pulse transformer 13. The other end of coil 17 and the screen grid of tube 11 are connected together and to a suitable source of positive potential at terminal 18. The suppressor grid of tube 11 is grounded and its cathode is connected to output terminal 19 and to ground through cathode resistor 20. The control grid of tube 11 is connected to one end of secondary coil 21 of pulse transformer 14 and the control grid of tube 12 is connected to the oppositely poled end of secondary coil 22 of transformer 13 as shown. The other ends of coils 21 and 22 are connected together and to one terminal of feedback condenser 15 and one end of resistor 23. The plate of tube 12 is connected to terminal 18 through primary coil 24 of transformer 14 as shown, the suppressor grid is grounded, the cathode is connected to the other terminal of condenser 15 and to ground through cathode resistor 25, and the screen grid is connected to terminal 18 and to ground through screen by-pass condenser 26. The ends of potentiometer 27 are connected to ground and terminal 28 respectively and to terminal 28 is connected a suitable source of negative voltage to bias the tubes. The other end of resistor 23 is connected to the slider of potentiometer 27, resulting in the actual bias voltage on tubes 11 and 12 being controlled by the position of this slider. It is to be noted that since secondaries 21 and 22 of transformers 13 and 14 are similarly wound and oppositely connected to their respective tube control grids, this circuit can not be regarded either as a blocking oscillator with amplifier feedback or an inductively coupled multivibrator.

In operation a positive trigger pulse having an abrupt sharply rising leading edge with a slope of several thousand volts per microsecond and a maximum amplitude of 75 to 100 volts is applied to input terminal 16 through any of the coupling means well known in the art. Since both tubes 11 and 12 are biased far beyond cutoff as above-described, the only effect of this trigger pulse is to induce in secondary coil 22 a positive pulse which is in turn applied to the control grid of tube 12. When the rate of increase or first derivative of the trigger pulse impressed on terminal 16 becomes sufficiently high, the positive voltage induced in coil 22 and hence that impressed on the control grid of tube 12 is sufficient to cause that tube to conduct. When tube 12 starts conducting, a negative voltage pulse is produced at its plate, and by transformer action a similar negative pulse is induced in secondary coil 21. Due to the crossed connections to coil 21 above-described, this pulse is positive when applied to the control grid of tube 11. Since the original trigger pulse has now passed through both transformers 13 and 14, the time at which the control grid of tube 11 becomes sufficiently positive to cause that tube to conduct depends upon the second time derivative of the initiating trigger pulse. Of course, since tube 12 is also part of the conduction path, the transconductance of that tube also affects this time of conduction of tube 11. It is desirable, therefore, to have not only a sharply rising initial trigger pulse, but also one which begins to rise abruptly, and, in addition, for tube 12 to have a high transconductance characteristic.

When tube 11 begins to conduct, a negative pulse appears at its plate and is coupled through transformer 13 to the control grid of tube 12, where it appears as a negative pulse. This negative pulse on the control grid stops tube 12 from conducting and produces a positive pulse at its plate. This positive pulse then produces a negative pulse at the control grid of tube 11 in a manner similar to that above-described to stop that tube from conducting. The resultant waveform at the cathode of tube 11 is thus a pulse of finite time duration, this duration being controlled by the time that tube was conducting, this time in turn being dependent upon the characteristics of the two transformers and the two tubes and the abrupt start and slope of the initial trigger applied to the circuit.

The large negative bias on tubes 11 and 12 prevents the circuit from being a free-running one. Feedback condenser 15 performs the essential function of reinforcing the action of the transformers by feeding back a signal of the correct polarity to the two control grids. For example, when a positive pulse is applied to the control grid of tube 12 it is desirable for the above-described circuit action to have both control grids driven even further positive. Tracing through the feedback action, it is seen that the positive pulse on the control grid of tube 12 produces a positive pulse at its cathode, which is then coupled through condenser 15 to coils 21 and 22 to raise the potential of both coils and hence that at both control grids to achieve the desired result.

In one test model built with the operational results hereinafter given in this specification, the circuit of the drawing was constructed on a Bakelite chassis to reduce stray capacitances and the following circuit parameters were used:

| | |
|---|---|
| Tubes 11 and 12 | commercial 6AG7 tubes |
| Transformers 13 and 14 | Westinghouse type 132DW |
| Condenser 15 | 0.2 microfarad |
| Condenser 26 | 1 microfarad |
| Resistor 20 | 10 ohms |
| Resistor 23 | 1 megohm |
| Resistor 25 | 10,000 ohms |
| Potentiometer 27 | 250,000 ohms |
| Potential at terminal 18 | (+) 400 volts |
| Potential at terminal 28 | (−) 150 volts |

It will be understood that the above circuit values and commercial designations are mentioned solely by way of exemplification and not in limitation of the invention. The output pulse at terminal 19 for the 75 volt input pulse above-described was observed to be greater than 75 volts in magnitude with its base less than 0.01 microseconds wide.

It is to be understood that while the operation of the above embodiment of this invention has been described with reference to a single input pulse, the embodiment is operable with a plurality of successive pulses. Also, while a specific embodiment has been described as required by the Patent Statutes, the principles of this invention are of much broader scope. Further, although this embodiment has been described in terms of pentode vacuum tubes, it is operable with other types of electron tubes, and while transformer 14 has been described as producing no inversion, it could be replaced by a transformer whose secondary is wound oppositely from its primary, the connections to the secondary coil, of course, then being reversed from those shown. Numerous additional specific applications of this invention will occur to those skilled in the art and no attempt has been made to exhaust such possibilities. The scope of the invention is defined in the following claims.

What is claimed is:

1. In a pulse generator, a first electron tube, a second electron tube, each of said tubes having at least a plate, means rendering said first tube conducting in response to an input trigger, and means for inverting the output at the plate of said first tube and applying the inverted output to said second tube to render said second tube conducting, said first mentioned means then applying the output at the plate of said second tube to said first tube to render said first tube non-conducting, whereby the output of said second tube comprises a pulse of a predetermined time duration.

2. In a pulse generator for producing a voltage pulse of extremely short time duration in response to the application of an abrupt sharply rising trigger pulse, a first electron tube, a second electron tube, each of said tubes having at least a plate, a control grid and a cathode, a first pulse transformer, a second pulse transformer, each of said transformers comprising a primary coil and a secondary coil, means connecting the primary coil of said first transformer in the plate circuit of said first tube and the primary coil of said second transformer in the plate circuit of said second tube, means connecting one end of the secondary coil of said first transformer to the control grid of said second tube and one end of the secondary coil of said second transformer to the control grid of said first electron tube, means joining the other two ends of the secondary coils of said first and second transformer at a junction point, and a condenser connected between said junction point and the cathode circuit of said second tube to reinforce the circuit action, whereby an abrupt sharply rising trigger applied to the plate of said first tube produces a voltage pulse of a predetermined time duration at the cathode of said first tube.

3. In a pulse generator, an electron tube, means responsive to input signal impulses applied thereto for controlling the operation of said tube, means responsive to the output of said tube for producing secondary impulses, means for applying said secondary impulses in combination with said input signal impulses to said tube controlling means for terminating the conduction of said tube before the termination of each of said signal impulses.

4. In a pulse generator, an electron tube, means responsive to the application thereto of signal pulses for controlling the operation of said tube, said means rendering said tube conducting in response to the application thereto of a first predetermined pulse for providing an output pulse at said tube, means responsive to said output pulse for producing a second predetermined pulse, and means applying said second predetermined pulse in combination with said first predetermined pulse to said tube controlling means for terminating the conduction of said tube.

5. In a pulse generator, an electron tube, means responsive to the application thereto of signal impulses for controlling the conduction of said tube, means for abstracting an output from said tube, means responsive to said output for producing a second impulse in response to a first impulse applied to said tube controlling means, said first impulse initiating the conduction of said tube, means for applying said second impulse to said tube controlling means for predeterminatively terminating the conduction of said tube.

6. In a pulse generator an electron tube, tube controlling means having input and output means, means for connecting said output means to said electron tube, said tube controlling means rendering said electron tube conducting in response to the application of an activating signal at said input means, means for amplifying the output of said tube, and means for applying said amplified tube output to the input means of said tube controlling means for predeterminatively limiting the conduction of said tube.

7. A pulse generator comprising an amplifying means, an electron tube responsive to the output of said amplifying means, means for applying a signal to the input of said amplifying means whereby said electron tube is rendered conductive, means for applying the output of said electron tube to the input of said amplifying means whereby said electron tube is rendered non-conductive and means associated with said electron tube providing an output signal during the interval said tube is conductive.

8. A pulse generator comprising, a first amplifier including an electron tube, said electron tube comprising at least an anode and a control grid, transformer means having at least a primary and a secondary winding, said primary winding being connected as the anode load of said electron tube, second amplifier means in which the input and output signals are of like polarity, the input of said second amplifier being connected to said secondary winding and the output of said second amplifier being connected to the control grid of said electron tube, means for applying an activating signal to the primary of said transformer means whereby said electron tube is succesively rendered conductive and non-conductive to produce an output pulse.

9. In a pulse generator for producing a voltage pulse of extremely short time duration in response to the application of an abrupt, sharply rising trigger pulse, first and second electron tubes, each including at least a plate, a cathode, and a control grid, first and second pulse transformers each having a primary coil and a secondary coil, means connecting the primary coil of said first transformer in the plate circuit of said first tube and the primary coil of said second transformer in the plate circuit of said second tube, means connecting one end of the secondary coil of said first transformer to the control grid of said second tube and one end of the secondary coil of said second transformer to the control grid of said first tube and means joining together the other two ends of the secondary coils of said first and second transformer.

10. A pulse generator comprising, first and second electron tubes, each including at least an anode, a cathode and a control grid, first and second pulse transformers each having a primary coil and a secondary coil, means connecting the primary coils of said first and second transformers in the anode circuits of said first and second tubes, respectively, means connecting one end of the secondary coil of said first transformer to the control grid of said second tube and one end of the secondary coil of said second transformer to the control grid of said first tube, and means joining together the other terminals of said secondary coils of said first and second transformers, said connections being such that a signal at said control grid of said first tube produces a signal of opposite polarity at the anode of said first tube and the control grid of said second tube and a signal at the control grid of said second tube produces a signal of the opposite polarity at the anode of said second tube and the same polarity at the control grid of said first tube.

11. Apparatus as defined in claim 10, and a capacitor connected between the junction of said secondary coils and the cathode of said second tube.

GEORGE E. VALLEY, Jr.

REFERENCES CITED

The following references are of record in the file of this patent:

UNITED STATES PATENTS

| Number | Name | Date |
| --- | --- | --- |
| 2,076,335 | Dallenbach | Apr. 6, 1937 |
| 2,193,850 | Andriew et al. | Mar. 19, 1940 |
| 2,319,320 | Hepp | May 18, 1943 |
| 2,485,395 | Lord | Oct. 18, 1949 |